United States Patent [19]
Alexander

[11] Patent Number: 5,577,789
[45] Date of Patent: Nov. 26, 1996

[54] INTERIOR LIGHT DEFLECTOR

[76] Inventor: Mark F. Alexander, 8315 W. Long Lake Dr., Portage, Mich. 49002

[21] Appl. No.: 599,980

[22] Filed: Feb. 14, 1996

Related U.S. Application Data

[63] Continuation-in-part of Ser. No. 356,728, Dec. 15, 1994, abandoned.
[51] Int. Cl.$^6$ .................................................... B60Q 3/02
[52] U.S. Cl. ............................................ 296/24.1; 362/74
[58] Field of Search .............................. 296/24.1; 362/74

[56] References Cited

U.S. PATENT DOCUMENTS

| | | |
|---|---|---|
| 4,519,018 | 5/1985 | Rowland .................................. 362/74 |
| 5,442,530 | 8/1995 | Viertel et al. .......................... 362/74 X |

*Primary Examiner*—Joseph D. Pape

[57] ABSTRACT

An interior light deflector relates to automobiles, vans, aircraft, minivans, station wagons, watercraft, busses, trains, auditoriums, arenas, theaters, and any other seating area. It consists of an opaque material usually hanging from the ceiling, large enough to prevent the interior light rays from the interior compartment light or lights of a vehicle or seating area from interfering with any of the occupants vision that are not using the light. The interior light deflector typically hangs short of the top of the seat and close enough to the interior light and at any 360° periphery of the light to prevent the interior light rays from being an annoyance to any of the occupants not using the interior light. The interior light deflector includes a fastening element on the upper region to fasten it to the ceiling and a fastening element on the lower region ends to fasten two or more together when two or more are in use. The interior light deflector will have a fastening element on the lower region allowing it to be fastened to a fastening element on the ceiling allowing it to be stowed out of the way when not being used.

1 Claim, 3 Drawing Sheets

INTERIOR LIGHT DEFLECTOR

This application is a continuation-in-part of Ser. No. 08/356,728 filed Dec. 15, 1994, now abandoned.

BACKGROUND TO THE INVENTION

Various devices have been constructed, and various methods employed in order to confine heated or cooled air to the forward area of a vehicle. For example U.S. Pat. No. 3,632,154 granted to Woodrich Jan. 4, 1972 discloses a device for retaining heated air in the operator's compartment of a van.

Moreover U.S. Pat. No. 4,095,837 granted to Hunter Jun. 20, 1978 discloses apparatus for segregating the air space within the passenger compartment of an automobile.

Yet another device is disclosed in Canadian patent No. 1,227,233 granted to W/S Group Inc. Sep. 22,1987 in which a device is employed to form a partition having safety and energy conservation purposes.

These and other prior art devices present relatively complicated structures which involve a degree of difficulty for installation and further require alteration or modification of the vehicles in which they are installed presenting the possibility of unsightly damage when they are removed. If transferred to other vehicle of different design, modification of the device is required or a different design is necessary for installation.

Further, the apparatus existent in the prior art is of a generally bulky nature requiring considerable space for storage within a vehicle, for packaging, or elsewhere when not in use.

In known partitions it is necessary for incorporation in the vehicle of permanently affixed or removably affixed beams located in the roof area and side brackets attached to the sides of the vehicle, and fastened by means such as magnets or bolts, epoxy or other adhesives and the dependence upon a side panel, door post or the like located in a strategic position to receive the side brackets. Once installed these partitions cannot be adjusted.

Reference Hunter U.S. Pat. No. 4,095,837 which states in part "The headliner 42 has been slit, and a plurality of ferrous plates have been fixedly secured to the automobile roof 46 as also shown in FIG. 4. The ferrous plates 44 may be secured by epoxy or the like".

Partitions are also known which are dependent upon contact with the backrest of the seat of the vehicle in which they are installed in order to effectively divide the vehicle air space. Hunter, U.S. Pat. No. 4,095,837 referenced above, provides for a curtain which "is disposed in a touching relationship with the backrest effectively dividing the air space there behind". Further, such known partitions are comprised of a plurality of side brackets for removable attachment to the opposed inner wall portions of automobiles.

Known partitions do not contain the elements of universality of use in vehicles in that they require forms of permanent alteration of certain of their own component parts in order to fit specific vehicles and once altered are unusable in other vehicles. As an example Hunter, United States patent mentioned herein previously provides of an "elongated support track" for support of a transparent curtain.

The patent granted to Hunter mentioned herein provides for a partition whose use in a variety of locations within any vehicle is substantially limited by the location of door posts, windows or hardware, housings required for side door opening and closing apparatus and the back of the automobile seat against which it must come in contact to be effective. Certain conditions or a combination thereof must be met for the partition to be installed and since these conditions cannot always be met the use and full function of the known partition is substantially limited. The presence of trim mouldings and door hardware further interferes with the installation and/or operation of the known partition whose installation is reliant upon a surface clear of encumbrances in order to conform to the profile of the vehicle in which it is installed. The installation and use of the known partition depends upon a solid surface both along the top of the elongated track and along the edges of the brackets to accommodate the magnets or other means for attachment.

Many minivans are constructed which incorporate overhead consoles containing lights and possibly air ducts which often extend backward from the windshield beyond the rear of the front seat and beyond the door posts of the vehicle. Such consoles render unusable known forms of partitions requiring contact with the back of a seat or which have a plurality of side brackets for removable attachment to the opposed inner wall portions of the vehicle since such plurality of side brackets would have to be aligned with door posts or other solid means of attachment.

Other known partitions such as that described in Canadian patent No. 1,277,233 issued to MacKenzie Sep. 9, 1987 involved components which must be held in place through use of bolts, plates and tracks to create a rigid barrier, the primary purpose of which is to act as a safety device to prevent objects from striking persons seated in the front seat of a vehicle in the event of an accident. The patent issued to MacKenzies shows a partition whose users must make alterations to their vehicles to allow for installation. The patent so issued states in part "Of course, the fleet owner would permanently install plates in the floors of all of his vehicles, and tracks in the roofs of all of his vehicles as their installation must be secure and their cost is low compared with the cost of the partition panel itself".

Another example Patent No. 5,238,282 issued to Watson Aug. 24, 1993 relates to accessories for automobiles vans, aircraft, minivan and station wagons and in particular to an improved partition comprised of a main support beam which requires no permanent attachment to the vehicle in which it is installed and from which is suspended generally from the roof to the floor transparent, semi-transparent or opaque curtain panels whose primary purpose is to substantially confine heated or cooled air or air containing smoke to a specific area of a vehicle. It is an object of Watsons invention to provide an improved vehicle interior partition the broadest aspect of which will substantially confine heated or cooled air or air containing smoke to a certain area of a vehicle while overcoming the noted disadvantages and others. The Watson partition has a spring clip means constructed of resilient material such as plastic, nylon or the like incorporate multiple prong means which can be tapered and which form a mouth to allow placement of the prongs of the spring clip means over the trim moulding, seams or protrusions of a vehicle thus permitting removable attachment of the partition to the trim or seams, metal or plastic protrusions of the vehicle and for the adjustment of the support beam in a wide variety of positions to achieve a close fit of the partition within the walls, ceiling and floor of the vehicle. Should different positions along the length of the trim, seams or other protrusion be required the spring clip means are capable of traversing the trim, seam or protrusion in a sliding manner allowing the partition to be located and held in the longitudinal position desired. In the abstract Watson describes the device as adjustable, requiring no permanent alterations to fit the interior of a very large variety of vehicles of different descriptions, can be collapsed and folded while not in use and remains intact while being portable and can be installed anywhere along the length of a vehicle interior where trim moulding, flanges or extrusions of vehicle components or door hardware exists. The installation and use of known partition depends upon these structures within the vehicle. It would be very impractical to use the partition on many planes, buses, trains, or seating arrangement where the occupants may want to move about freely or converse. The patent granted to Watson substantially confines heated or cooled air to a specific area of a vehicle. This would be an unwanted situation in most any of the circumstances where a person or persons would want to use an interior light deflector. The above examples of partition devices are usually the width and height of the interior of the vehicle in which they are installed.

SUMMARY OF THE INVENTION

Regardless of geographic location it is seldom possible to prevent the interior compartment light rays of a vehicle or seating area from getting into the vision of the occupants not using the interior compartment lights. It is an object of this invention to provide an interior light deflector to prevent the light rays coming from the interior light or lights from disturbing the drivers or any of the occupants vision that are not using the interior light. A prime object of the invention is to provide an interior light deflector that can be installed by means of fastener to the vehicle or seating arrangement structure (room or auditorium) that will prevent the interior light rays from an interior light or lights from disturbing any of the occupants eye sight that are not using the interior light while allowing free movement of air-flow throughout the vehicle or seating area. It also allows complete visibility from the inside to the outside of the vehicle. The interior light deflector while in use and while not in use allows the occupants of a vehicle or seating area to move about the entire vehicle or seating area freely and to converse without interference or segregation. The approximate size of the interior light deflector is 4"×4" to 8"×8" but is not limited to this size and dimension. The size and dimension may vary depending on the size and dimension it needs to be to prevent the interior light rays from entering any of the occupants eye sight that are not using the interior light. When being used in a vehicle the deflector is usually fastened to the ceiling and hangs short of the vehicle floor and typically stops short of the top of the seat within any distance and any 360° periphery to the interior light to prevent the interior light rays from being a annoyance to the occupants not using the interior light.

The interior light deflector is generally located on the ceiling but is not limited to the ceiling of the passenger compartment of vehicles generally including but not limited to automobiles, vans, minivans, station wagons, trucks, busses, aircraft, watercraft, trains. The invention can also be used in auditoriums, arenas, and any other seating areas.

According to one aspect of the present invention there is included a light deflector made of a light flexible or rigid material such as cloth, plastic, vinyl which has a dimension which will shield the interior lights rays from being an annoyance to any of the occupants not using the interior light.

The interior light deflector will have a fastening means on the upper region of the deflector to cooperate with a fasten-ing means on the ceiling to allow the shield to hang when in use and a second fastening means at the lower region of deflector to cooperate with a fastening means on the ceiling for stowing the interior light deflector out of the way proximate the ceiling when not in use. The invention will have fastening means on both corners or sides of the lower region so when two or more deflectors are in use they may be fastened together by these fastening means so they will not swing apart thus allowing light rays to shine from between them.

Another object is to provide an interior light deflector that may be permanently fastened to the vehicle by the manufacturer of the vehicle by being sewn, adhesively fastened or by any other fastening means. The fasteners used to secure the deflector when not in use may be fastened in the same manner, also the fastening means on both sides or corners of the lower region to hold two or more deflectors together may be fastened in the same manner.

If the deflector is fastened to the ceiling by the fastening means on only the upper and lower regions of the deflector, the fastening means on the ceiling can be eliminated. Example: if Velcro (TM) will fasten to the ceiling then Velcro (TM) only need be fastened to the shields upper and lower region, and not to the ceiling as means to fasten the deflector. This is true also if the deflector can be fastened to the ceiling by means of adhesives or any other fastening means.

A further object is to provide an interior light deflector that is simple and easy to use. A further object is to provide an interior light deflector that is economical in cost to manufacture. Further objects of the invention will appear as the description proceeds.

To the accomplishment of above and related objects, this invention may be embodied in the form illustrated in the accompanying drawings attention being called to the fact, however, that the drawings are illustrative only, and that changes may be made in the specific construction illustrated and described within the scope of the appended claims.

BRIEF DESCRIPTION OF THE DRAWINGS

In order that the present invention may be more fully understood it will now be described by way of example and in reference to accompanying drawings in which.

DESCRIPTION OF THE PREFERRED EMBODIMENTS

Like parts have been given like numbers throughout the figures.

Figure 1:
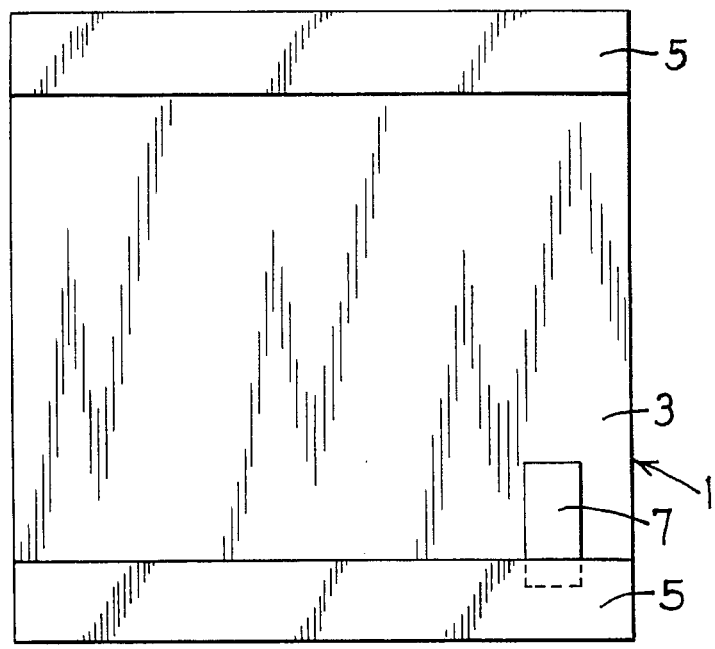
FIG. 1 is an elevational plan view of the inventive device.

FIG. 1 shows the inventive device 1 made up of a sheet of opaque material 3 with fastening means 5 here Velcro(™) affixed to the upper & lower edges of the opaque material 3.

Figure 2:
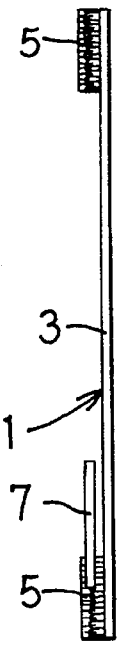
FIG. 2 is an edge view of the inventive device.

FIG. 2 the edge view of the inventive device shows in addition to the opaque material 3 and fastening means 5 the location of a tape 7 which will be described here and after.

Figure 3:
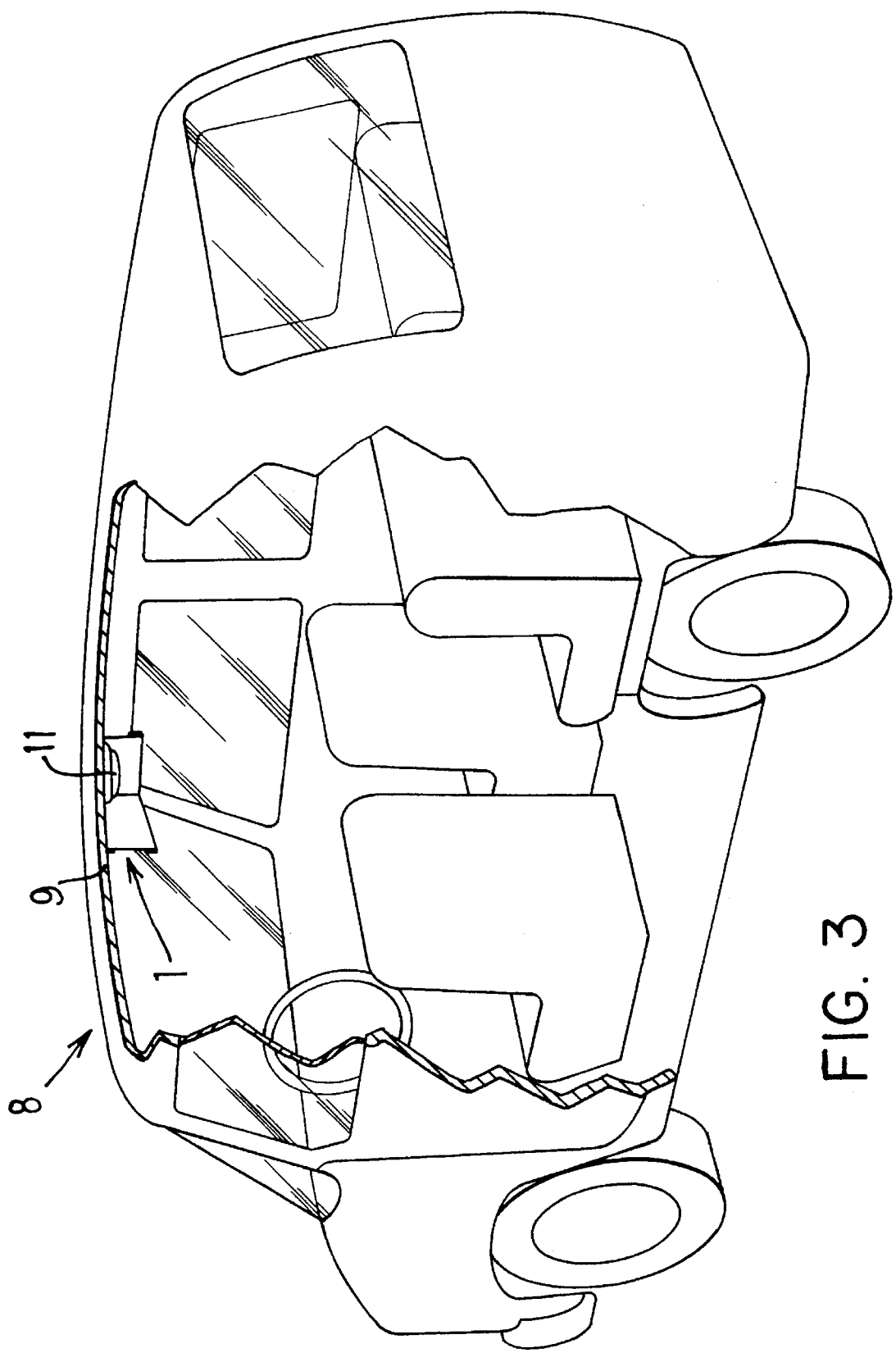
FIG. 3 is an automotive vehicle cut away to show the inventive device in position to block the light from a drivers eyes.

In FIG. 3 in the cut away of the automotive vehicle 8 is shown the headliner 9 and the compartment light 11 with the inventive device 1 installed forward of the interior compartment light 11 to prevent the intrusion of light into to drivers compartment of the automotive vehicle 8.

Figure 4:
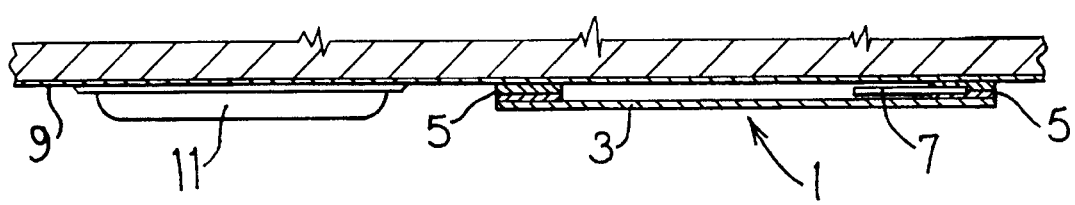
FIG. 4 is a sectional view looking to the drivers side of a vehicle from the passengers side showing the inventive device installed in a stored or stowed position.

FIG. 4 is a sectional view of the interior view of an automotive vehicle showing the headliner 9 and the interior compartment light 11 and the stored position of the inventive device 1 where it is affixed to the headliner 9 by means of Velcro(™) or fastening means 5 which can be applied to the vehicle at the factory or by the consumer which ever is preferred.

Figure 6:
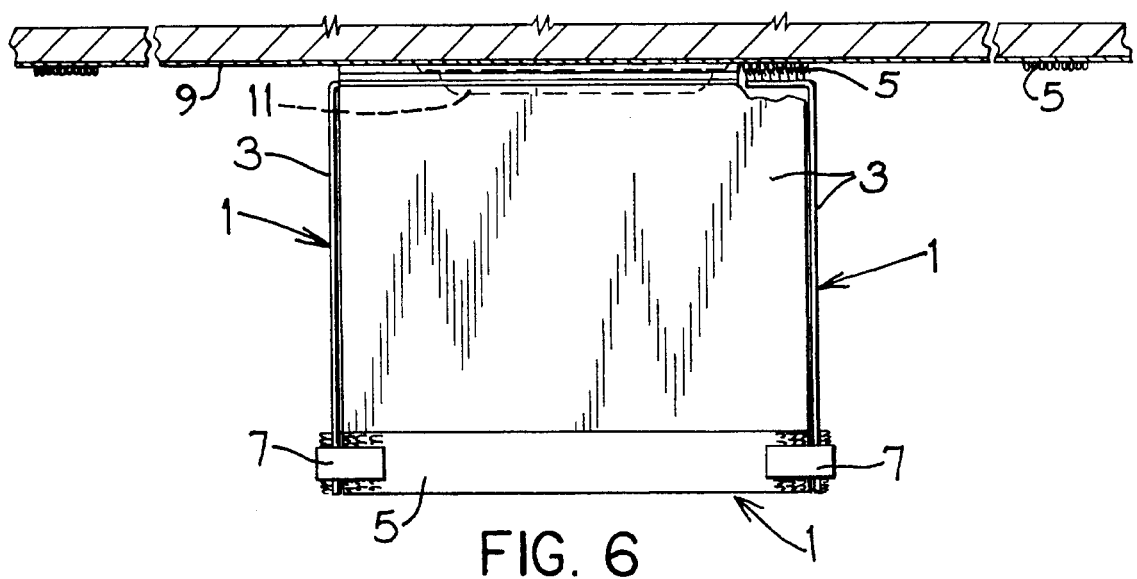
FIG. 6 is a view looking rearward from the drivers compartment to the rear of the vehicle showing multiple inventive devices positioned to block the illumination in several different directions, here three, from the interior compartment light.
Figure 5:
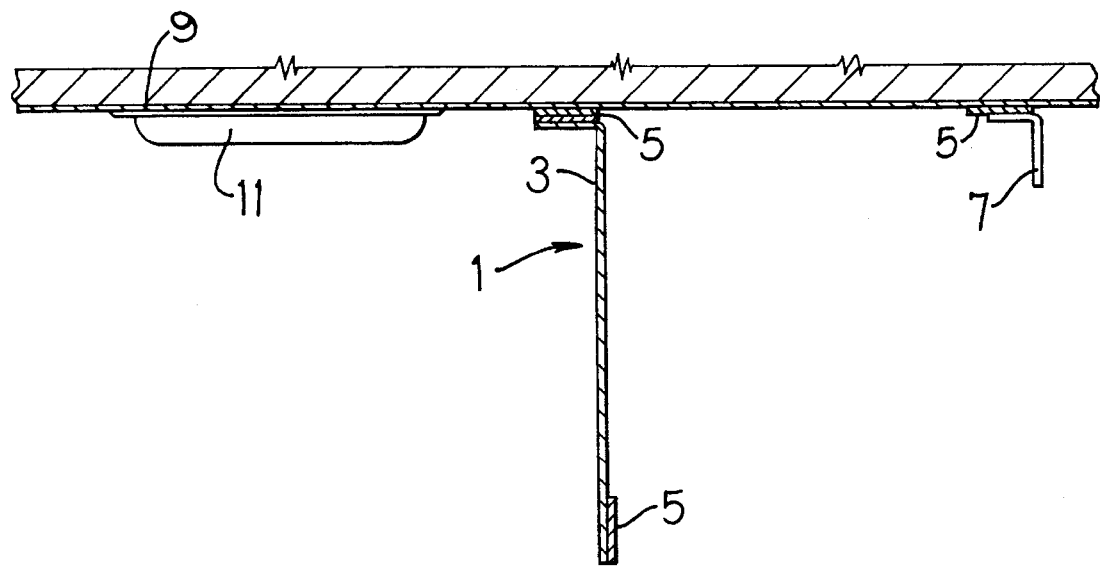
FIG. 5 is a sectional view looking at the drivers side of a vehicle from the passengers side showing the inventive device in a position of use.

FIG. 5 shows the inventive device 1 in it's operating position to block the light from the interior compartment light 11 from intruding into the drivers compartment of the automotive vehicle 8. The inventive device 1 is suspended from the fastening means 5 that is shown at the upper edge of the inventive device 1 that is shown in FIG. 1. Multiple inventive devices 1 can be used in combination with each other as shown in FIG. 6 (here 1 front 2 sides to enclose three sides of interior compartment light) to prevent further intrusion of light into the passenger compartment of the automotive vehicle 8. The tape 7 as seen in FIG. 6 is used to fasten the devices 1 together at the intersection of the corners or sides to further prevent the light emitting from the interior compartment light 11 to encroach upon the drivers compartment of the automotive vehicle 8.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairy constitute essential characteristics of the generic or specific aspects of this invention.

What is claimed is new and desired to be protected by Letters Patent is set forth in the appended claims:

1. An interior light deflector for a vehicle for substantially preventing light rays from an interior light of the vehicle from becoming an annoyance by disturbing the vision of one or more occupants of the vehicle that are not using the interior light for illumination, comprising:

an opaque sheet of flexible or rigid material having an upper region and a lower region;

fastening means connected to said upper region of said sheet of material for hanging said material from a support in the vehicle interior adjacent the interior light to block light rays of the interior light from directly disturbing the vision of the one or more occupants that are not using the interior light; and fastening means connected to said lower region of said sheet of material for maintaining said sheet of material in a stowed position lying adjacent said support when not in use;

said sheet of material being of sufficient size so as to block the light rays from the vision of the one or more occupants that are not using the interior light without interfering with the interior air flow of the vehicle for either heating or cooling the region of the vehicle in which the one or more occupants are located.

\* \* \* \* \*